W. C. WINFIELD.
ELECTRICAL WELDING MACHINE.
APPLICATION FILED AUG. 17, 1908.
935,346.
Patented Sept. 28, 1909.
2 SHEETS—SHEET 1.
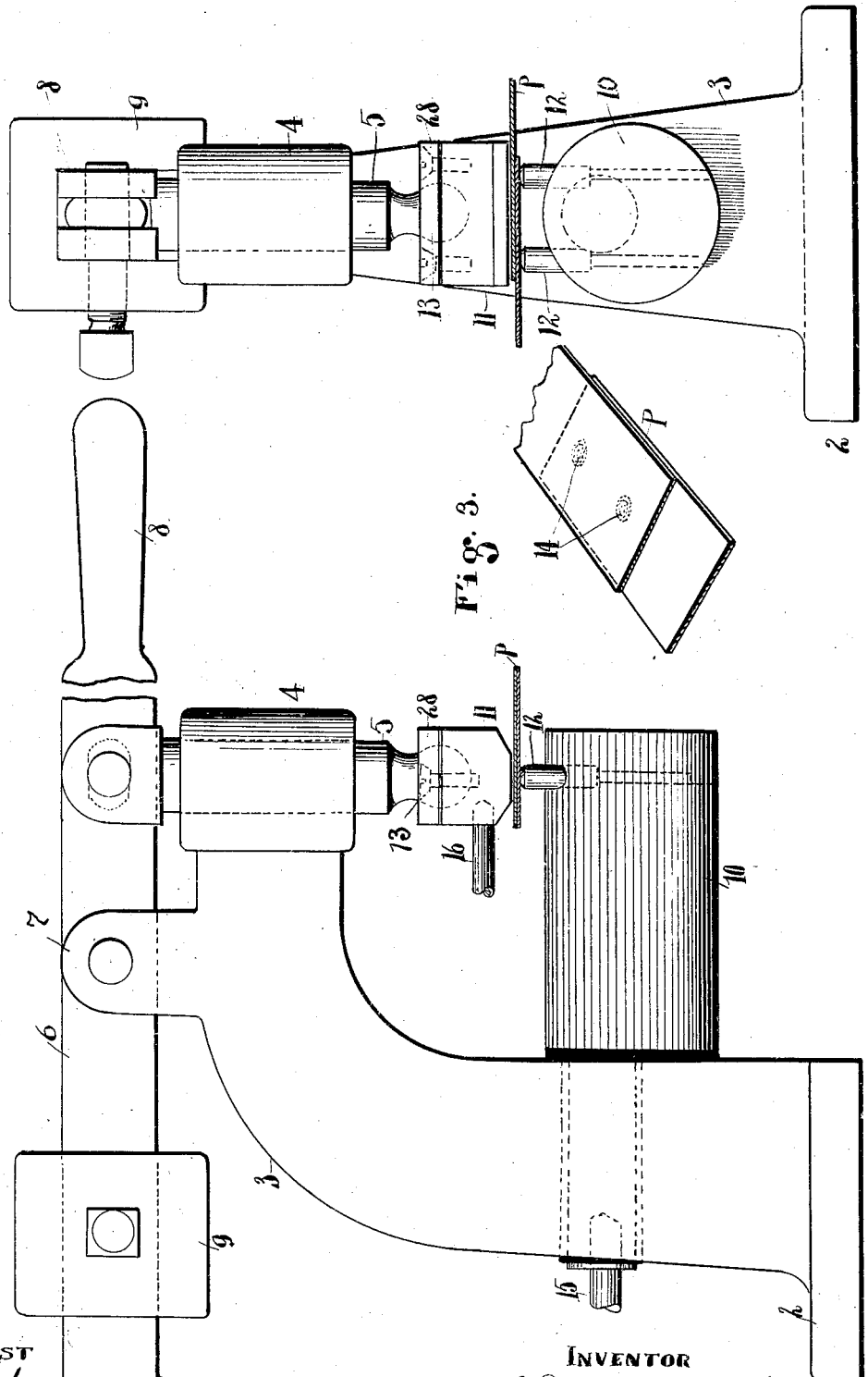
INVENTOR
William C. Winfield
By Fisher & Moset ATTYS.

W. C. WINFIELD.
ELECTRICAL WELDING MACHINE.
APPLICATION FILED AUG. 17, 1908.

935,346.

Patented Sept. 28, 1909.

UNITED STATES PATENT OFFICE.

WILLIAM C. WINFIELD, OF WARREN, OHIO.

ELECTRICAL WELDING-MACHINE.

935,346.

Specification of Letters Patent.   Patented Sept. 28, 1909.

Application filed August 17, 1908.  Serial No. 448,799.

*To all whom it may concern:*

Be it known that I, WILLIAM C. WINFIELD, a citizen of the United States, residing at Warren, in the county of Trumbull and State of Ohio, have invented certain new and useful Improvements in Electrical Welding-Machines, and do declare that the following is a full, clear, and exact description of the invention, which will enable others skilled in the art to which it appertains to make and use the same.

My invention relates to electrical welding machines, and the invention comprises means for welding small areas of surface at different points simultaneously, all substantially as hereinafter described and more particularly pointed out in the claims.

The cost of welding by electricity is often prohibitive for certain classes of products, especially where light gage material is used.

One of my objects is to provide means to reduce this cost to a minimum by effecting a saving in electrical current and in reducing the area of the welds and the number of welding operations over a given area of surface.

A further object of the means so provided is to minimize the danger of burning the material being welded and which danger is always a factor to be considered in welding light gage material. Again, as the welding occurs under pressure it is absolutely imperative to equalize the pressure over the different areas being welded so that uniform welding will occur at all contacted points at the same time. Thus, if welding is taking place simultaneously at different points under unequal pressures and contacts, one or more welds will be unfinished or one or more will have burned through.

My invention contemplates the use of means for equalizing the pressure brought to bear upon the material being welded, whether at one or more points and in making uniform contacts so that perfect welds will be obtained at different points.

Figure 4:
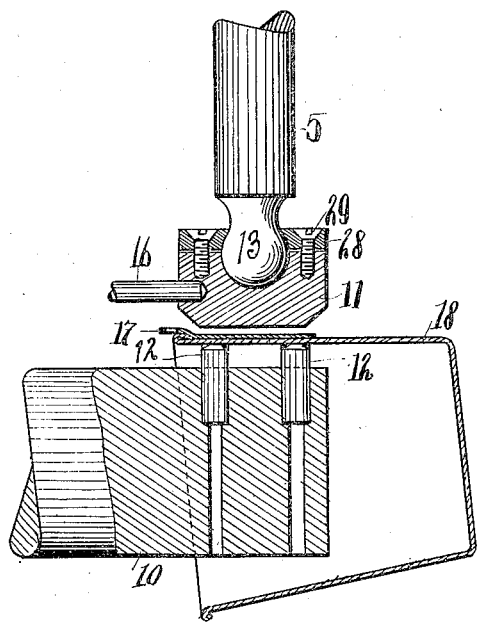
Figure 5:
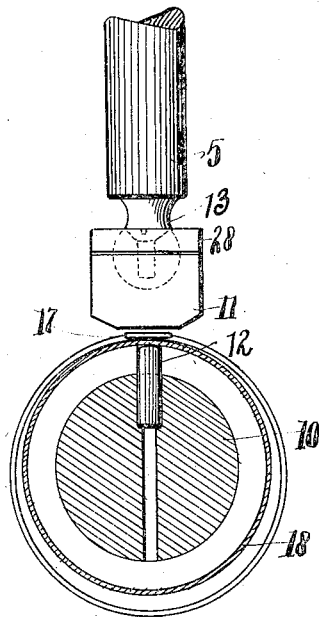
Figure 6:
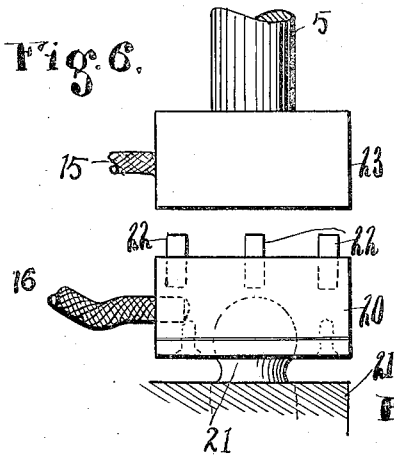
Figure 7:
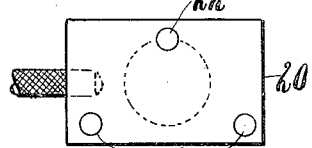

In the accompanying drawings, Figure 1 is a side elevation of a hand operated machine embodying my invention, and Fig. 2 is a front elevation thereof. Fig. 3 is a perspective view of two lapped pieces of metal showing two welds as produced by the means illustrated in Figs. 1 and 2. Fig. 4 is a sectional view in part of the main working members seen in Figs. 1 and 2, but showing a longitudinal arrangement of the contact pins upon the mandrel or work support instead of transversely as in said figures, and Fig. 5 is an end and sectional view of the parts seen in Fig. 4. A pail or bucket is shown in said Figs. 4 and 5 as resting upon the contact pins with a supplemental ear piece laid thereon in welding position. Fig. 6 is a modification of a set of contact clamping members reversely arranged from the showing of Figs. 1 and 2, and with three contact pins instead of two. Fig. 7 is a bottom view of the rock member in Fig. 6 showing the staggered arrangement of the contact pins.

The machine comprises a base—2—adapted to be securely fastened or mounted upon a suitable bench or other support, and a standard 3 on said base having a forwardly projecting and vertically bored top portion 4 adapted to slidably support a vertically movable plunger 5 and a horizontal operating lever 6 pivotally engaged with the upper end of said plunger and pivotally mounted in ears or lugs 7 on said top portion. Lever 6 has a handle 8 at its front end and extends to the rear of its pivot support to hold a counterweight 9, and it is through this lever that the operator brings pressure to bear upon the work during welding operations.

The work is indirectly supported by a mandrel or arbor like member 10 rigidly mounted upon standard 3 at its front but insulated therefrom, and this member extends beneath plunger 5 and the rocking or equalizing head or member 11 thereon. Said rock member 11 is in two parts and preferably of copper, and has a ball connection 13 centrally at its top with plunger 5, whereby freedom of movement and a tilting or rocking action is obtained which distributes the pressure from plunger 5 equally upon the work at different points dependent upon the number of contact pins in use and their relative location to the plunger axis. Thus, in Figs. 1 and 2, I show a pair of copper contact pins 12 mounted in the upper side of mandrel member 10 and these pins are arranged transversely of said member and are equally distant from the axial line of plunger 5. In Figs. 4 and 5 similar pins 12 are shown as arranged longitudinally of mandrel 10 with the plunger centrally located above and between them.

Pins 12 actually support the work, and in Figs. 1 and 2 the work is represented by two plates or strips P, which overlap and rest one upon the other and which joint or overlap is finally welded together as seen in Fig. 3, wherein the two stippled or dotted areas 14 serve to illustrate the extent of the welds produced by my machine. The electrical current required for welding purposes is obtained by suitable connections 15 and 16, leading to the mandrel member 10 and rocking member 11, respectively. The means for controlling the current is not shown but it will be understood that it also is under the control of the operator.

In Figs. 4 and 5, a bail supporting member 17 is arranged lengthwise upon the outside of a pail or bucket 18, and a double weld is produced opposite pins 12 when head 11 is lowered and pressure is brought to bear thereon and the current is flowing. The pressure being equal by reason of the equalizing member, the same amount of current is passed through the material at both points opposite pins 12, and a pair of welded areas of the same extent and of the same character and uniformity is thereby produced and in the same interval of time.

The question of time in which the current is in, is important of course, but this is under the control of the operator and may be more or less dependent upon the kind of material in hand. But in any event, it is essential that the same amount of current shall pass through the immediate contacts, otherwise imperfect work will be done. The pressure equalizing member provides for uniform contact and pressures at two or more contact points and the welds thus produced are relatively small in area and approximately of the same size as the end of the contact pins 12 and which welds integrally unite the overlapped pieces of metal at different points.

In Figs. 6 and 7, the rock member 20 shown therein is mounted on a fixed or stationary ball support 21 with a series of three contact pins 22 projecting upwardly therefrom, and opposite a movable pressure contact member 23. Viewed in plan, pins 22 are offset in respect to each other and radially set in respect to the rock or tilting center.

It will be understood that rock members 11 and 20 are more or less frictionally held in place upon their respective ball connections by their fastening plates 28 and screws 29. This friction is sufficient to hold the said members at any fixed relation to the work except when under pressure to accommodate inequalities in the work and in contacts. Obviously, said rock members might be definitely limited in their tilting or rock movements.

What I claim is:—

1. In electrical welding machines, a set of current conveying members having a plurality of contacts between them, means to apply pressure to said members, and means to permit a universal movement between said members to produce a plurality of welds in one operation of the parts.

2. In electrical welding machines, a power member, current conveying contact members between which the work is introduced, one of said contact members having a universal connection with said power member, and one of said contact members having a plurality of contact portions adapted to make a plurality of welds in a single operation of the parts.

3. In electrical welding machines, a movable power member and a current conveying contact member having a ball connection therewith, and a second current conveying member having a plurality of contact pins opposite said first contact member.

4. In an electrical welding machine, means comprising a ball jointed equalizing device and contacts for welding relatively small areas of metal at different points simultaneously.

5. In an electrical welding machine, a set of current conveying members having a plurality of contact pins, and a ball connection for one of said members to permit compensating movements between said members.

6. In an electrical welding machine, an equalizer contact member having a universal joint and a second contact member opposite thereto, said members movably related in respect to each other to bring pressure upon the material being welded, and one of said members having a plurality of contact pins socketed therein and adapted to make a plurality of welds.

7. In an electrical welding machine, a reciprocable plunger and a set of current conveying contact members, one having a universally rotatable and frictional locking connection with said plunger, and one of which is provided with a plurality of contact portions.

8. In an electrical welding machine, current conveying contact members having a plurality of contacts and a pivotal ball connection centrally disposed in respect to said contacts to permit compensating movements and equal distribution of pressure thereto, and means to apply pressure upon said members.

9. An electrical welding machine comprising a supporting standard and a mandrel, and a plunger movably mounted in said standard opposite said mandrel, a current conveying head having a ball attachment with said plunger, and a series of current conveying contact pins on said mandrel opposite said head.

10. An electrical welding machine having a reciprocable plunger provided with a ball shaped end and a lever to operate the same, a work support having a plurality of contact pins, and a rocking member carried by said plunger and opposite said pins, and current conveying connections leading to said head and pins.

11. An electrical welding machine consisting of a horizontal work support and a vertically movable plunger above the same, a counterweighted lever to operate said plunger, a current conveying head having a ball and socket connection with said plunger and a locking plate therefor, and a set of contact pins adapted to make a plurality of welds at a single operation of said machine.

12. In an electrical welding machine, a set of current conveying members, one of said members having a universal joint connection to permit universal tilting movements thereof on different radial lines, and a plurality of contact pins on one of said members radially disposed in respect to the center of movement of said joint connection.

13. In an electrical welding machine, a set of current conveying contact members oppositely disposed and movably related, one of said members having a ball joint, and one of said members having a contact pin adapted to weld a relatively small area of metal.

In testimony whereof I sign this specification in the presence of two witnesses.

WILLIAM C. WINFIELD.

Witnesses:
E. M. FISHER,
R. B. MOSER.